Patented Aug. 20, 1940

2,212,035

UNITED STATES PATENT OFFICE 2,212,035

CONVERSION OF HYDROCARBONS

Jacque C. Morrell and Aristid V. Grosse, Chicago, Ill., assignor to Universal Oil Products Company, Chicago, Ill., a corporation of Delaware No Drawing. Application April 30, 1938, Serial No. 205,370

13 Claims. (Cl. 260—668)

This invention relates more particularly to the conversion of straight chain hydrocarbons into closed chain cyclic hydrocarbons.

More specifically it is concerned with a process involving the use of special catalysts and specific conditions of operation in regard to temperature, pressure, and time of reaction whereby aliphatic hydrocarbons can be efficiently converted into aromatic hydrocarbons.

In the straight pyrolysis of pure hydrocarbons or hydrocarbon mixtures such as those encountered in fractions from petroleum or other naturally occurring or synthetically produced hydrocarbon mixtures the reactions involved which produce aromatics from paraffins and olefins are of an exceedingly complicated character and cannot be very readily controlled.

It is generally recognized that in the thermal decomposition of hydrocarbon compounds or hydrocarbon mixtures of relatively narrow range that whatever intermediate reactions are involved, there is an overall loss of hydrogen, a tendency to carbon separation and a generally wider boiling range in the total liquid products as compared with the original charge. Under mild cracking conditions involving relatively low temperatures and pressures and short times of exposure to cracking conditions it is possible to some extent to control cracking reactions so that they are limited to primary decompositions and there is a minimum loss of hydrogen and a maximum production of low boiling fractions consisting of compounds representing the fragments of the original high molecular weight compounds. Thus as a classic example, it has been shown that a n-dodecane may be thermally decomposed under carefully regulated conditions to produce substantial yields of n-hexene and n-hexane, indicating a split at the center of the hydrocarbon chain without any loss of hydrogen.

As the conditions of pyrolysis are increased in severity using higher temperatures and higher times of exposure to pyrolytic conditions, there is a progressive increase in loss of hydrogen and a large amount of secondary reactions involving recombination of primary radicals to form polymers and some cyclization to form naphthenes and aromatics, but the mechanisms involved in these cases are of so complicated a nature that very little positive information has been evolved in spite of the large amount of experimentation which has been done and the large number of theories proposed. In general, however, it may be said that starting with paraffin hydrocarbons representing the highest degree of saturation that these compounds are changed progressively into olefins, naphthenes, aromatics, and finally into carbon and hydrogen and other light fixed gases. It is not intended to infer from this statement that any particular success has attended the conversion of any given paraffin or other aliphatic hydrocarbon into an aromatic hydrocarbon of the same number of carbon atoms by way of the progressive steps shown. If this is done it is usually with very low yields which are of no practical significance.

The search for catalysts to specifically control and accelerate desired conversion reactions among hydrocarbons has been attended with the usual difficulties encountered in finding catalysts for other types of reactions since there are no basic laws or rules for predicting the effectiveness of catalytic materials and the art as a whole is in a more or less empirical state. In using catalysts even in connection with conversion reactions among pure hydrocarbons and particularly in connection with the conversion of the relatively heavy distillates and residua which are available for cracking, there is a general tendency for the decomposition reactions to proceed at a very rapid rate, necessitating the use of extremely short time factors and very accurate control of temperature and pressure to avoid too extensive decomposition. There are further difficulties encountered in maintaining the efficiency of the catalysts employed in pyrolysis since there is usually a rapid deposition of carbonaceous materials on their surfaces and in their pores.

In one specific embodiment the present invention comprises the conversion of aliphatic hydrocarbons including paraffin and olefin hydrocarbons into aromatic hydrocarbons by subjecting them at elevated temperatures of the order of 400–700° C. to contact for definite times of the order of 6–50 seconds with catalytic materials comprising alumina-silica base materials supporting minor amounts of oxides of tin.

According to the present invention aliphatic or straight chain hydrocarbons having 6 or more carbon atoms in chain arrangement in their structure are specifically dehydrogenated in such a way that the chain of carbon atoms undergoes ring closure with the production in the simplest case of benzene from n-hexane or n-hexene and in the case of higher molecular weight paraffins of various alkyl derivatives of benzene. Under properly controlled conditions of times of contact, temperature, and pressure very high yields of the order of 75 to 90% of the benzene or aromatic compounds are obtainable which are far in excess of any previously obtained in the art either with or without catalysts. For the sake of illustrating and exemplifying the types of hydrocarbon conversion reactions which are specifically accelerated under the preferred conditions by the present types of catalysts, the following structural equations are introduced.

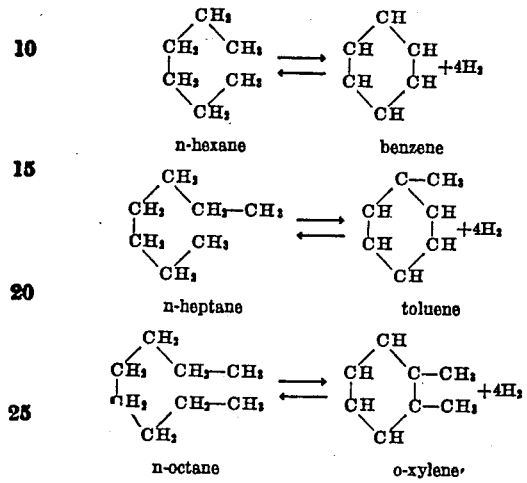

n-hexane    benzene
n-heptane   toluene
n-octane    o-xylene

In the foregoing table the structural formulas of the primary paraffin hydrocarbons have been represented as a nearly closed ring instead of by the usual linear arrangement for the sake of better indicating the possible mechanisms involved. No attempt has been made to indicate the possible intermediate existence of mono-olefins, di-olefins, hexamethylenes or alkylated hexamethylenes which might result from the loss of various amounts of hydrogen. It is not known at the present time whether ring closure occurs at the loss of one hydrogen molecule or whether dehydrogenation of the chain carbons occurs so that the first ring compound formed is an aromatic such as benzene or one of its derivatives. The above three equations are of a relatively simple character indicating generally the type of reactions involved but in the case of n-paraffins or mono-olefins of higher molecular weight than the octane shown and in the case of branch chain compounds which contain various alkyl substituent groups in different positions along the six-carbon atom chain, more complicated reactions will be involved. For example, in the case of such a primary compound as 2,3-dimethyl hexane the principal resultant product is apparently o-xylene although there are concurrently produced definite yields of such compounds as ethyl benzene indicating an isomerization of two substituent methyl groups. In the case of nonanes which are represented by the compound, 2,3,4-trimethyl hexane, there is formation not only of mesitylene but also of such compounds as methyl ethyl benzol and various propyl benzols.

It will be seen from the foregoing that the scope of the present invention is preferably limited to the treatment of aliphatic hydrocarbons which contain at least 6 carbon atoms in straight chain arrangement. In the case of paraffin hydrocarbons containing less than 6 carbon atoms in linear arrangement, some formation of aromatics may take place due to primary isomerization reactions although obviously the extent of these will vary considerably with the type of compound and the conditions of operation. The process is readily applicable to paraffins from hexane up to dodecane and their corresponding olefins. With increase in molecular weight beyond this point the percentage of undesirable side reactions tends to increase and yields of the desired alkylated aromatics decrease in proportion.

The catalysts which are employed in accelerating the conversion of straight chain hydrocarbons to cyclic hydrocarbons according to the present invention consist of a major proportion of a highly porous and at the same time refractory material supporting a minor proportion of tin oxides, the latter furnishing the greater proportion of the total catalytic effect. The base materials which are essentially the supports for the more active tin oxide catalysts may be prepared by a number of methods and may consist of alumina-silica complexes in which the molal ratios of the two oxides vary over a considerable range. The catalysts are preferably prepared so that there are substantially no contaminating compounds present such as the alkali metal salts which may be occluded or adsorbed during the original precipitations. In other words the preferred catalysts consist essentially only of alumina-silica complexes and tin oxides, the last named being in a highly dispersed condition on the surface and in the pores of the alumina-silica granules to furnish extended surfaces for catalytic action.

In the following paragraphs brief summaries are given of the methods which may be employed for forming the alumina-silica carriers and to add the tin oxides. It is to be understood in general that the alumina-silica composites which may be looked upon more or less in the light of synthetic silicates may be prepared either by co-precipitation or by separate precipitation and mixing of the alumina and silica, the original hydrated composites being calcined to remove water, ground, and sized before the necessary tin oxides are added and that the invention also comprises the concurrent or subsequent precipitation of tin hydroxides on the alumina-silica base material in aqueous suspension.

1. Solutions of soluble alkali metal silicates and soluble aluminum salts, the latter including soluble aluminates, may be mixed in varying proportions to jointly precipitate hydrated alumina and hydrated silica in varying proportions. The general reaction in this method of forming alumina-silica complexes is illustrated below:

$2AlCl_3 + Na_2SiO_3 + 3H_2O \rightleftharpoons$
$Al_2O_3.SiO_2.H_2O + 2NaCl + 4HCl$ In this case stannic or stannous chloride may be present in the solution and its precipitation in and on the hydrated alumina-silica precipitate be accomplished by the addition of requisite amounts of some alkali such as sodium hydroxide or sodium carbonate. However, a better method is to form alumina-silica complexes separately and wash the primary precipitate thoroughly with hydrochloric acid, ammonium chloride, or aluminum chloride to displace adsorbed alkali metals so that the base material is substantially free from contaminating compounds. In this case, after calcining, grinding, and sizing, the particles are added to a solution of a tin salt and the tin hydroxides are precipitated by the addition of alkaline reagents after which the hydroxides are dehydrated at minimum temperatures to avoid decomposition of the tin oxides.

2. Hydrated silica and hydrated alumina may be separately precipitated and the precipitates mixed in the wet condition. In the case of silica a convenient method is to acidify a solution of an alkali metal silicate to precipitate a silica gel. In the case of alumina the desired hydroxide may be precipitated by the addition of alkalis particularly ammonium hydroxide although other precipitants such as ammonium carbonate, ammonium hydrosulfide, or ammonium sulfide may be employed. Base carrying materials made in this manner may be mixed directly with stannous hydroxide or stannic acid in the wet condition or added to solutions of tin salts and the hydrated tin oxides precipitated as under section 1.

3. A separately precipitated hydrated silica may be added to an aqueous solution of an aluminum salt and the hydrated alumina precipitated in the presence of the suspended silica by the addition of alkaline precipitants. In this case the precipitation of alumina may be conducted in a solution containing also a soluble tin salt and by using a sufficient excess of alkaline precipitant the tin hydroxides may be in a sense co-precipitated with the aluminum hydroxide so that a very intimate mixing is obtained. Alternatively, the formation of the alumina-silica base may be conducted separately and the tin oxides added subsequently.

4. A separately precipitated hydrated alumina may be added to an alkali metal silicate and the silica precipitated in the presence of the alumina by the addition of just the required amount of acid which is insufficient to redissolve the alumina. After the formation of the alumina-silica mass by this method, the tin oxides may be added by any of the methods described in the preceding section.

It can be seen from the above that any method of obtaining a primary mix of hydrated silica and hydrated alumina may be employed within the scope of the invention to produce carriers for tin oxide and precipitate tin hydroxides thereon which may be converted to oxides by dehydration, although obviously the character and efficiency of the ultimately prepared alumina-silica-tin oxide masses will vary somewhat with the exact conditions of precipitation and/or mixing, the ratio of alumina to silica, and the amount of the tin oxides present.

Among the soluble compounds of tin which may be employed as a source of tin hydroxides, the halides, both stannous and stannic may be mentioned and also stannous sulfate. Other compounds such as di-methyl stannic fluoride having the formula $(CH_3)_2SnF_2$ and various tetra alkyl ammonium stannates may be employed.

It has been found essential to the production of high yields of aromatics from aliphatic hydrocarbons when using the preferred types of catalysts that depending upon the aliphatic hydrocarbon or mixture of hydrocarbons being treated, temperatures from 400–700° C. should be employed, contact times of approximately 6 to 50 seconds and pressures approximating atmospheric. The use of subatmospheric pressures of the order of ¼ atmosphere may be beneficial in that reduced pressures generally favor selective dehydrogenation reactions but on the other hand moderately superatmospheric pressures usually of the order of less than 100 lbs. per square inch tend to increase the capacity of commercial plant equipment so that in practice a balance is struck between these two factors. The times of contact most commonly employed with n-paraffinic or mono-olefinic hydrocarbons having from 6–12 carbon atoms to the molecule are of the order of 6–20 seconds. It will be appreciated by those familiar with the art of hydrocarbon conversion in the presence of catalysts that the factors of temperature, pressure, and time will frequently have to be adjusted from the results of preliminary experiments to produce the best results in any given instance. The criterion of the yield of an aromatic having the same number of carbon atoms in the ring as the original aliphatic hydrocarbon charged had in the chain will serve to fix the best conditions of operation. In a general sense the relations between time, temperature, and pressure are preferably adjusted so that rather intensive conditions are employed of sufficient severity to insure a maximum amount of the desired cyclization reactions with a minimum of undesirable side reactions. If too short times of contact are employed the conversion reactions will not proceed beyond those of simple dehydrogenation and the yields of olefins and diolefins will predominate over those of aromatics.

While the present process is particularly applicable to the production of the corresponding aromatics from an aliphatic hydrocarbon or a mixture of aliphatic hydrocarbons, the invention may also be employed to produce aromatics from aliphatic hydrocarbon mixtures such as distillates from paraffinic or mixed base crude petroleum. In this case the aromatic character of the distillates will have increased and as a rule the octane number will be higher. If desired and found feasible on a basis of concentration, the aromatics produced in the hydrocarbon mixture may be recovered as such by distillation into fractions of proper boiling range followed by chemical treatment with reagents capable of reacting selectively with them. Another method of aromatic concentration will involve the use of selective solvents such as liquid sulfur dioxide, alcohols, furfural, chlorex, etc.

In operating the process the general procedure is to vaporize hydrocarbons or mixtures of hydrocarbons and after heating the vapors to a suitable temperature within the ranges previously specified to pass them through stationary masses of granular catalytic material in vertical cylindrical treating columns or banks of catalyst-containing tubes in parallel connection. Since the reactions are endothermic it may be necessary to apply some heat externally to maintain the best reaction temperature. After passing through the catalytic zone the products are submitted to fractionation to recover cuts or fractions containing the desired aromatic product with the separation of fixed gases, unconverted hydrocarbons and heavier residual materials, which may be disposed of in any suitable manner depending upon their composition. The overall yield of aromatics may be increased by recycling the unconverted straight chain hydrocarbons to further treatment with fresh material, although this is a more or less obvious expedient and not specifically characteristic of the present invention.

The present types of catalysts are particularly effective in removing hydrogen from chain compounds in such a way that cyclization may be promoted without removal of hydrogen from end carbon atoms so that both end and side alkyl groups may appear as substituents in benzene rings and it has been found that under proper operating conditions they do not tend to promote any great amount of undesirable side reactions leading to the deposition of carbon or carbonaceous materials and for this reason show reactivity over relatively long periods of time. When their activity begins to diminish after a period of service, it is readily restored by the simple expedient of oxidizing with air or other oxidizing gas at moderately elevated temperature, usually within the range employed in the dehydrogenation and cyclization reactions. This oxidation effectively removes traces of carbon deposits which contaminate the surface of the particles and decrease their efficiency. It is characteristic of the present types of catalysts that their activity may be repeatedly regenerated with only a very gradual loss of catalytic efficiency.

The following example showing the preparation of a catalyst and its use in converting a particular paraffin hydrocarbon into an aromatic hydrocarbon is introduced to indicate the practical possibilities of the present process although not with the intention of limiting the scope in exact correspondence with the data presented.

To make the base catalytic material a solution consisting of 284.2 grams of sodium silicate hydrate ($Na_2SiO_3.9H_2O$) in 1.333 liters of water was added slowly with stirring to 482.86 grams of aluminum chloride hexahydrate ($AlCl_3.6H_2O$) dissolved in 1.333 liters of water. To the resulting mixture 333 cc. of concentrated ammonium hydroxide solution (Sp. Gr. 0.90) was added, 2.333 liters of water then added and the mixture allowed to stand at room temperature for 18 hours. The mass was then filtered and the filter cake was removed, stirred into a slurry with a solution containing 13.38 grams ammonium chloride and 2.5 cc. concentrated ammonium hydroxide per liter after which the slurry was again filtered, this operation being performed several times. The filter cake was then stirred into a slurry in 2 liters of the ammonium hydroxide-ammonium chloride solution, this last operation being performed four times. The mass was dried, formed under pressure into 6 to 10 mesh granules and finally dried at 932° F. this procedure producing granules in which the ratio of silica to alumina was substantially 1:1.

The above prepared material was added to a solution of stannous chloride containing a sufficient amount of tin so that when the hydroxide was precipitated by the use of sodium hydroxide and the material was washed and calcined there was approximately 8% of stannic oxide present.

A hexane fraction obtained from a Pennsylvania crude having a boiling point of 69° C. was vaporized and passed over the catalyst at a temperature of 540° C., substantially atmospheric pressure, and a time of contact of approximately 18 seconds. In a single pass approximately 50% of benzene was produced, calculated on the weight of the normal hexane charged. By fractionation of the products and recycling of the unconverted material the final yield of benzene was 70%.

We claim as our invention:

1. A process for the manufacture of cyclic hydrocarbons from straight chain hydrocarbons which comprises subjecting said straight chain hydrocarbons in vapor form at elevated temperatures to contact with granular catalytic material comprising essentially a prepared alumina-silica mass supporting a minor amount of an oxide of tin.

2. A process for the manufacture of substantial yields of aromatic hydrocarbons from straight chain hydrocarbons having from six to twelve carbon atoms in straight chain arrangement which comprises subjecting said straight chain hydrocarbons in vapor from at elevated temperatures to contact with granular catalytic material comprising essentially a prepared alumina-silica mass supporting a minor amount of an oxide of tin.

3. A process for the manufacture of cyclic hydrocarbons from straight chain hydrocarbons which comprises subjecting said straight chain hydrocarbons in vapor form at elevated temperatures of the order of 450–700° C. to contact with granular catalytic material comprising essentially a prepared alumina-silica mass supporting a minor amount of an oxide of tin.

4. A process for the manufacture of substantial yields of aromatic hydrocarbons from straight chain hydrocarbons having from six to twelve carbon atoms in straight chain arrangement which comprises subjecting said straight chain hydrocarbons in vapor form at elvated temperatures of the order of 450–700° C. to contact with granular catalytic material comprising essentially a prepared alumina-silica mass supporting a minor amount of an oxide of tin.

5. A process for the manufacture of cyclic hydrocarbons from straight chain hydrocarbons which comprises subjecting said straight chain hydrocarbons in vapor form at elevated temperatures of the order of 250–700° C. and pressures from approximately 0.25 to 1 atmosphere absolute to contact with granular catalytic material comprising essentially a prepared alumina-silica mass supporting a minor amount of an oxide of tin.

6. A process for the manufacture of substantial yields of aromatic hydrocarbons from straight chain hydrocarbons having from six to twelve carbon atoms in straight chain arrangement which comprises subjecting said straight chain hydrocarbons in vapor form at elevated temperatures of the order of 450–700° C. and pressures from approximately 0.25 to 1 atmosphere absolute to contact with granular catalytic material comprising a prepared alumina-silica mass supporting a minor amount of an oxide of tin.

7. A process for the manufacture of cyclic hydrocarbons from straight chain hydrocarbons which comprises subjecting said straight chain hydrocarbons in vapor form at elevated temperatures of the order of 250–700° C. and pressures from approximately 0.25 to 1 atmosphere absolute for times of from 6–50 seconds to contact with granular catalytic material comprising essentially a prepared alumina-silica mass supporting a minor amount of an oxide of tin.

8. A process for the manufacture of substantial yields of aromatic hydrocarbons from straight chain hydrocarbons having from six to twelve carbon atoms in straight chain arrangement which comprises subjecting said straight chain hydrocarbons in vapor form at elevated temperature of the order of 450–700° C. and pressures from approximately 0.25 to 1 atmosphere absolute for times of from 6 to 50 seconds to contact with granular catalytic material comprising essentially a prepared alumina-silica mass supporting a minor amount of an oxide of tin.

9. A process for the manufacture of benzene from normal hexane which comprises subjecting the vapors of said hexane at temperatures within the range of 550–650° C., sub-atmospheric pressures, and times of from 6 to 20 seconds to contact with a prepared alumina-silica mass supporting a minor amount of an oxide of tin.

10. A process for the manufacture of toluene from normal heptane which comprises subjecting the vapors of said heptane at temperatures within the range of 550-650° C., sub-atmospheric pressures, and times of from 6 to 20 seconds to contact with a prepared alumina-silica mass supporting a minor amount of an oxide of tin.

11. A process for producing aromatic hydrocarbons from aliphatic hydrocarbons of at least six carbon atoms in straight chain arrangement, which comprises subjecting the aliphatic hydrocarbon to dehydrogenating and cyclicizing conditions in the presence of an alumina-silica composite supporting a minor amount of an oxide of tin.

12. A process for producing aromatic hydrocarbons from paraffinic hydrocarbons of at least six carbon atoms in straight chain arrangement, which comprises subjecting the paraffinic hydrocarbon to dehydrogenating and cyclicizing conditions in the presence of an alumina-silica composite supporting a minor amount of an oxide of tin.

13. A process for producing aromatic hydrocarbons from olefinic hydrocarbons of at least six carbon atoms in straight chain arrangement, which comprises subjecting the olefinic hydrocarbon to dehydrogenating and cyclicizing conditions in the presence of an alumina-silica composite supporting a minor amount of an oxide of tin.

JACQUE C. MORRELL.
ARISTID V. GROSSE.